United States Patent [19]

Denker

[11] Patent Number: 4,889,224
[45] Date of Patent: Dec. 26, 1989

[54] PRODUCT ALIGNMENT DEVICE

[75] Inventor: Stanley D. Denker, New Richmond, Wis.

[73] Assignee: Doboy Packaging Machinery, Inc., New Richmond, Wis.

[21] Appl. No.: 329,348

[22] Filed: Mar. 27, 1989

[51] Int. Cl.$^4$ .............................................. B65G 47/24
[52] U.S. Cl. ................................. 198/382; 198/396; 198/411; 198/415; 198/454
[58] Field of Search ............... 198/396, 411, 415, 454, 198/382

[56] References Cited

U.S. PATENT DOCUMENTS

| | | | |
|---|---|---|---|
| 2,704,146 | 3/1955 | Reck | 198/396 X |
| 3,047,123 | 7/1968 | McKay | 198/411 X |
| 3,165,193 | 1/1965 | Stevenson, Jr. | 198/415 |
| 3,245,734 | 1/1981 | Deutschlander et al. | |
| 3,386,557 | 6/1968 | Ross et al. | |
| 3,508,640 | 4/1970 | Good et al. | 198/411 X |
| 3,602,358 | 8/1971 | Jakobsson | 198/415 X |
| 3,704,773 | 12/1972 | Lingg et al. | |
| 3,866,739 | 2/1975 | Sikorski | 198/415 X |
| 4,085,839 | 4/1978 | Crawford | |
| 4,311,230 | 1/1982 | Crawford et al. | |
| 4,413,723 | 11/1983 | Stobb | |
| 4,421,222 | 12/1983 | Stuermer | 198/396 X |
| 4,499,990 | 2/1985 | Fishback | 198/411 |
| 4,676,361 | 6/1987 | Heisler | |
| 4,720,006 | 1/1988 | Lenherr | |

*Primary Examiner*—Robert J. Spar
*Assistant Examiner*—James R. Bidwell
*Attorney, Agent, or Firm*—Haugen and Nikolai

[57] ABSTRACT

A conveyor system which receives products in random order at its infeed end and delivers product in a serial aligned order at its outlet end. The conveyor system comprises first and second endless belt conveyors which are longitudinally aligned and positioned such that the product exiting the first conveyor is received on the second conveyor. The first conveyor is of a greater width than the second and at the location where they meet is a third endless belt conveyor moving in a direction perpendicular to the longitudinal flow direction of the other two. The machine that feeds products to the first conveyor is set at a desired product flow rate in terms of products-per-minute and the speed of the first conveyor is set to handle that capacity. The second belt is driven at a speed equal to or greater than the product-per-minute rate times the product length. As misaligned products flowing on the first conveyor are intercepted by the transversely positioned third conveyor, the products are rotated as they are urged onto the second conveyor so that the length dimension of the products is generally aligned with the second conveyor.

7 Claims, 1 Drawing Sheet

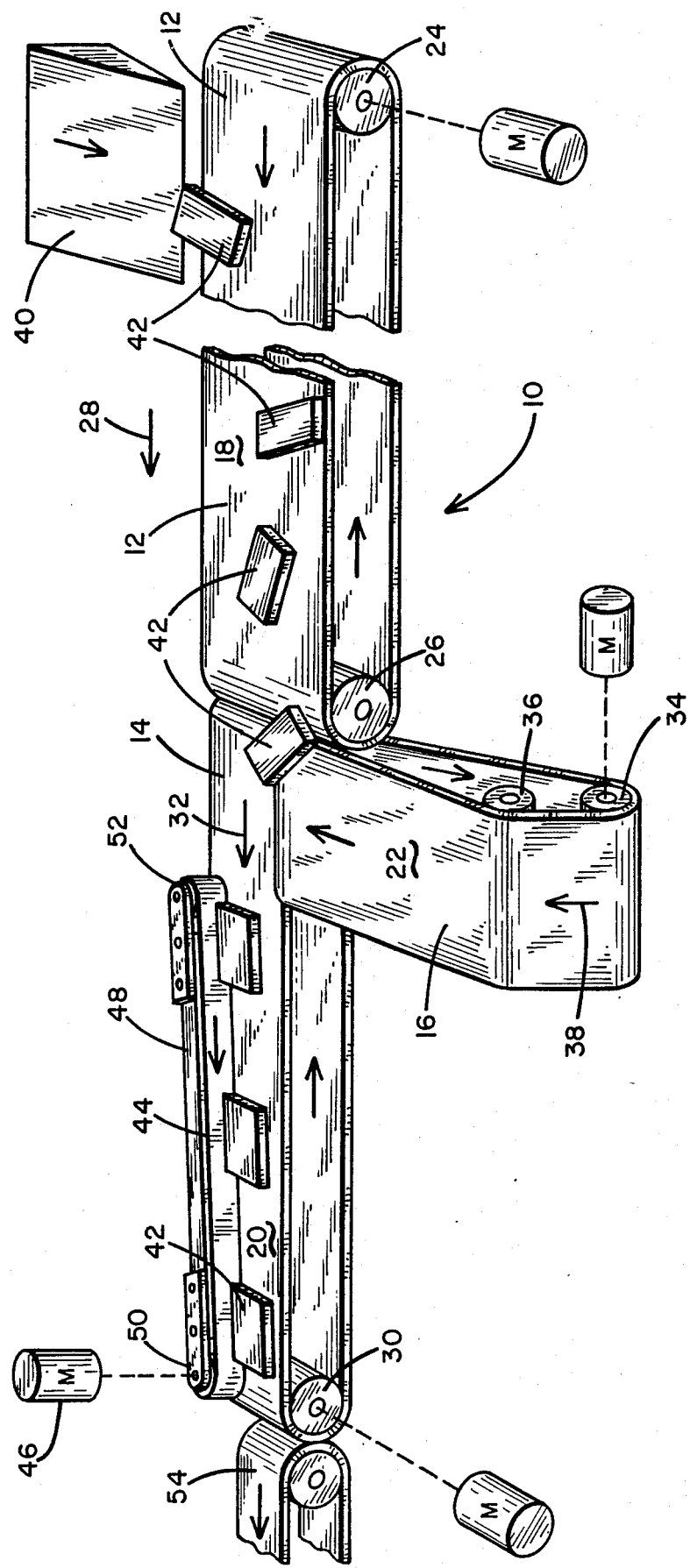

PRODUCT ALIGNMENT DEVICE

BACKGROUND OF THE INVENTION

I. Field of the Invention

This invention relates generally to materials handling apparatus, and more particularly to a conveyor system for aligning products in a serial, head-to-tail orientation as the products are moved along the conveyor assembly.

II. Discussion of the Prior Art

In the preparation of many manufactured items for sale, the products in question are to be wrapped in individual film or paper wrappers and, in this regard, high speed horizontal wrapping machines are often employed. These machines receive product between spaced lugs on an infeed chain and carry the products in timed relation into a film former where a continuous tube is made to surround the products. Following that, they flow past a transverse, cut/seal head whose rotation is timed such that the cut/seal blades fall into the space between adjacent products. An example of such a horizontal wrapper is shown in the Eaves et al Patent 4,574,566. So that the product will arrive at the high-speed wrapper in a desired spaced relationship relative to the flights of the pusher lugs on the wrapper's infeed conveyor chain, where the products are not perfectly symmetrical, it is important that they be appropriately aligned in advance of reaching the wrapper's infeed conveyor. When it is considered that many products exit a production machine in a random, unaligned order, it is necessary that a means be provided for appropriately aligning oblong objects before they are timed for entry into the wrapper's infeed conveyor.

In the past, it has been the practice to use stationary surfaces disposed in the path of travel of the products in an attempt to funnel or guide the products into a single file orientation. Specifically, a vertical wall surface is disposed in the path of the conveyor at a predetermined angle to the direction of flow so that as the product comes into contact with this angled wall, they will be diverted to a more narrow opening and carried beyond it by the moving belt. A principal drawback of this approach centers on the fact that if more than one product reaches the opening at a given time, it will become clogged and jammed, resulting in potential damage to the product and the necessity of shutting the system down to clear the jam. To obviate jamming, it is also known that a plurality of endless belts trained about rollers journaled for rotation about vertical axes and disposed diagonally to the path of travel of the product can be used. However, this arrangement requires more floor space, is somewhat more expensive and has excessive rubbing contact with the product.

The Crawford et al Patent 4,311,230 describes a system for advancing products in serial order to the flighted infeed chain of a high-speed wrapper. The implementation shown in that patent is distinctly different and far more complicated in its makeup than the product alignment device of the instant invention.

The Lenherr Patent 4,720,006 describes another moving belt product orienting system in which belt speed differentials are used to rotate a product by 90°. It does not appear suitable for handling randomly organized products exiting the conveyor belt 2 thereof.

Thus a need exists for a system capable of receiving products in a random orientation and for aligning those products, single file, on a moving conveyor. It is the principal object of the present invention to supply that need.

SUMMARY OF THE INVENTION

The foregoing defects and problems with the prior art are obviated in accordance with the present invention by providing a first, upstream conveyor of the moving-belt type on which the products to be wrapped are deposited in random order. This belt is driven at a rate to accommodate the products/minute output of the production machinery with which the conveyor is used. This conveyor is of a predetermined width approximately equal to the length of the products diagonal and disposed downstream thereof is a second moving-belt conveyor of a somewhat narrower width than the first and with its direction of movement aligned with that of the first. This second conveyor is driven at a speed which is slightly greater than the product-per-minute rate of the first conveyor times the product length, thus insuring that the products can be carried away at a sufficiently high rate to prevent backlogging of the product on the second conveyor. Located at the junction between the first and second conveyors is a third endless belt conveyor having a flight lying in a slightly elevated plane as compared to the second and with the downstream end thereof abutting the side edge of the second conveyor and its own edge abutting the downstream end of the first conveyor.

As disoriented product moves down the first conveyor and engages the interface between the first and third conveyors, a rotation or spin is placed on the product tending to align the longitudinal axis of the product with the direction of movement of the second conveyor.

The singlulation of the products is further enhanced by providing either a vertical, moving or a stationary wall surface across the width dimension of the second conveyor belt and generally oriented transverse but at an angle to the direction of movement of the third conveyor belt. In this fashion, product propelled laterally across the width dimension of the second conveyor belt due to the momentum imparted to the product by the third conveyor belt comes into contact with that vertical surface and is carried away by the second conveyor belt. If a moving vertical conveyor is used rather than a stationary wall, the surface thereof can be scraped clean. This is desirable when the product has a sticky character, such as a chocolate- covered confection.

DESCRIPTION OF THE DRAWING

The foregoing features and advantages of the invention will become apparent to those skilled in the art from the following detailed description of a preferred embodiment especially when considered in conjunction with the accompanying drawing which illustrates a perspective view of the product alignment apparatus of the present invention.

DESCRIPTION OF THE PREFERRED EMBODIMENT

In the drawing, referred to generally by numeral 10, is the product alignment system of the present invention. It is seen to include first, second and third endless belt conveyors 12, 14 and 16, respectively. Each of the conveyors is entrained about a drive roller and one or more driven rollers to define three generally horizontal flights 18, 20 and 22. Thus, the first conveyor 12 is seen to include a drive roller 24 and a driven roller 26 for causing the conveyor belt to be driven in the longitudinal direction represented by the arrow 28. In a similar fashion, the second conveyor 14 is equipped with a drive roller 30 and a driven roller (which is hidden from view by the conveyor 16) to define the horizontal flight 20 moving in the direction indicated by the arrow 32.

The second conveyor 14 is located immediately adjacent to and downstream from the first conveyor 12 and is of a predetermined width dimension generally about one-half the width dimension of the first conveyor 12. The width of the first conveyor is preferably about equal to the diagonal length of the product to be aligned.

Located immediately adjacent the juxtaposed ends of the conveyors 12 and 14 is the third conveyor 16. It has a drive roller 34, first driven rollers 36 and a second driven roller hidden from view by the end of conveyor 12, all three of which are journaled for rotation on a frame (not shown) so as to define the horizontal flight 20 22. The flight 22 of the endless conveyor 16, when driven, moves in the direction of the arrow 38 and is positioned with its right side edge closely adjacent to and slightly lower than the downstream end of the first conveyor 12 and the downstream end of the third conveyor is, in turn, juxtaposed close to the side edge and slightly above the flight 20 of the second endless belt conveyor 14.

As is illustrated in the drawing, products produced by a manufacturing machine (not shown) may either slide down a chute 40 and arrive on the upper horizontal flight 18 of the first conveyor 12 or be delivered to conveyor 12 by still another conveyor (not shown). The products 42 are seen to be oblong in shape, having a length dimension greater than the width dimension thereof.

The speed of the first conveyor 12 is set to accommodate the production rate of the machine with which the system is used. Thus, for example, if the production machine should produce say, candy bars, at a rate of 400 per minute, the speed of the belt 12 will be sufficient to transport the randomly oriented bars away from the production machine so as to avoid piling or stacking of the products.

The speed of the second conveyor 14 is set at a value slightly greater than the product length times the output rate of the machine. Thus, if in the example being discussed, candy bars are each 5 inches long and the production machine produces the products at a rate of 400 per minute, the speed of the belt 14 would be set slightly greater than 2,000 inches per second. This will insure that when the products are serially aligned head-to-tail on the second endless belt conveyor 14, a slight separation will be maintained between the products as they are carried downstream toward the high-speed wrapping apparatus (not shown).

The speed of the third belt 16 is not particularly critical and, for the example being discussed here, may move at a speed anywhere in the range of from 900 to 1,800 inches per second.

Positioned immediately ahead of the downstream end of the third endless belt conveyor 16 and across the width dimension of the second conveyor belt 14 is a vertical wall surface 44 which functions as a back stop. As mentioned, this wall may be stationary but preferably comprises a vertical belt, i.e., one trained about rollers having vertical axes and which is driven by a motor 46 at the same speed as belt 14. The belt 44 overlay the flight 20 and is oriented at a small acute angle to the direction of product flow. Specifically, the belt 44 is entrained about an elongated bar 48 which is cantilevered to overlie the flight 20, the drive roller 50 and idler roller 52 being journaled at opposed ends of the bar 48 and with the bar extending at a slight angle to the longitudinal axis of belt 14.

In operation, as the randomly oriented products travel down the first conveyor 12, those that are already generally aligned with the second conveyor 14 will merely pass from the conveyor 12 onto conveyor 14 without encountering the transversely oriented endless belt conveyor 16. Where, however, a product is out of longitudinal alignment with the direction of belt movement, a portion of the product will encounter the surface of the transversely moving belt 16 Belt 16 will impart a twist or rotation to the product, thereby tending to align it with the longitudinal direction of the second conveyor 14.

Depending on the point where the products moving down the first conveyor exit it onto the third conveyor, a translational force will also be imparted to the product to move it onto the second conveyor belt 14. The backstop surface 44 prevents products propelled across the width of the second conveyor belt from falling to the floor. Because surface 44 is driven at the same speed as belt 14, the product is not scuffed as it is urged laterally across the width of flight 20 by the inclination of belt 44 relative to the longitudinal axis of belts 12 and 14. By urging the product toward the forward edge of flight 20, it can be precisely aligned with the downstream conveyor or if, for any reason, it is unaligned, it can be ejected from the flight 20.

It has been found expedient to utilize conveyor belts having differing coefficients of friction relative to the products being handled. Specifically, the surface of the second conveyor belt 14 is preferably made from or coated with a material exhibiting a relatively high coefficient of friction as compared to the surfaces of the belts 12 and 16. This provides aggressive gripping between the product and the second conveyor belt while allowing slippage between the product and the other two belts as the transfer is made from those belts to the second conveyor.

It is intended that the product alignment system 10 of the present invention be used with a high speed horizontal wrapping machine. As such, it is necessary that an intermediate product timing conveyor 54 be employed between the product alignment apparatus and the flighted infeed chain of the wrapper. Such a timing arrangement is fully disclosed in the Eaves et al Patent 4,604,704 assigned to the assignee of the present application and need not be described in detail herein. Suffice it to say that the timing system of the said Eaves et al patent can be used to receive the serially-aligned product from the product alignment apparatus 10 so as to provide the necessary positional adjustment and velocity to cause the arriving products to mesh with the flights defined by the pusher fingers on the wrapper's infeed chain.

This invention has been described herein in considerable detail in order to comply with the Patent Statutes and to provide those skilled in the art with the information needed to apply the novel principles and to construct and use such specialized components as are required. However, it is to be understood that the invention and devices, and that various modifications, both as to the equipment details and operating procedures, can be accomplished without departing from the scope of the invention itself.

What is claimed is:

1. Apparatus for aligning randomly oriented products of predetermined length and width dimensions in serial, head-to-tail relation while said products are traversing a moving belt conveyor system comprising:
   (a) a first endless conveyor belt trained about a drive roller and a driven roller to define a horizontal flight with an upstream end and a downstream end and moving at a first rate in a first direction for receiving said products thereon in random order;
   (b) a second endless conveyor belt trained about a drive roller and a driven roller to define a horizontal flight and an upstream end and a downstream end and longitudinally aligned with said horizontal flight of said first conveyor, said second conveyor moving at a second rate in said first direction, said second conveyor belt being of a lesser width than said first conveyor belt; and
   (c) a third endless belt with an upstream end and a downstream end and trained about a drive roller and a driven roller to define a horizontal flight moving generally perpendicular to said first direction, said horizontal flight of said third endless belt positioned adjacent said downstream end of said first conveyor with said downstream end of said third endless belt abutting a side edge of said second endless belt proximate said upstream end of said second conveyor.

2. The apparatus of claim 1 wherein said first rate is related to the product flow rate onto said first endless belt conveyor and is sufficient to prevent stacking of products on said first endless conveyor belt.

3. The apparatus as in claim 2 wherein said second rate is equal to or greater than said product flow rate times the length of the products.

4. The apparatus as in claim 1 wherein said second endless belt conveyor has a greater coefficient of friction relative to said products than said first and third endless conveyor belts.

5. The apparatus as in claim 1 and further including a backstop member positioned to intercept products propelled laterally across said second endless conveyor belt by said third endless conveyor belt.

6. The apparatus as in claim 5 wherein said backstop member is a moving vertical belt.

7. The apparatus as in claim 1 wherein said horizontal flight of said first conveyor is at a higher elevation than said horizontal flight of said second conveyor which is at a lower elevation than said horizontal flight of said third conveyor.

* * * * *